(12) United States Patent
D'Angelo et al.

(10) Patent No.: US 8,185,773 B2
(45) Date of Patent: May 22, 2012

(54) PROCESSOR SYSTEM EMPLOYING A SIGNAL ACQUISITION MANAGING DEVICE AND SIGNAL ACQUISITION MANAGING DEVICE

(75) Inventors: Giuseppe D'Angelo, Tufino (IT); Antonio Anastasio, Villaricca (IT); Leos Chalupa, Jemnice (CZ)

(73) Assignees: STMicroelectronics S.r.l., Agrate Brianza (IT); Freescale Semiconductor, Inc., Austin, TX (US)

( * ) Notice: Subject to any disclaimer, the term of this patent is extended or adjusted under 35 U.S.C. 154(b) by 693 days.

(21) Appl. No.: 12/347,388

(22) Filed: Dec. 31, 2008

(65) Prior Publication Data

US 2010/0169696 A1    Jul. 1, 2010

(51) Int. Cl.
*G06F 1/04*    (2006.01)

(52) U.S. Cl. ......... 713/502; 713/400; 713/401; 713/500

(58) Field of Classification Search .................. 713/375, 713/400, 500, 501, 502
See application file for complete search history.

(56) References Cited

U.S. PATENT DOCUMENTS

| | | |
|---|---|---|
| 5,862,502 A | 1/1999 | Giers |
| 6,502,019 B1 | 12/2002 | Zydek et al. |
| 6,704,628 B1 | 3/2004 | Fennel et al. |
| 6,823,251 B1 | 11/2004 | Giers |
| 2001/0045941 A1* | 11/2001 | Rosenberg et al. ............ 345/161 |
| 2006/0176059 A1* | 8/2006 | Mir et al. ...................... 324/503 |
| 2007/0073908 A1* | 3/2007 | Gormley ........................... 710/8 |

* cited by examiner

*Primary Examiner* — Paul Yanchus, III
(74) *Attorney, Agent, or Firm* — Seed IP Law Group PLLC

(57) ABSTRACT

A processor system having a processor core configured to control an external apparatus in accordance with a control algorithm; a signal acquisition managing device configured to receive state signals provided by the apparatus, perform corresponding actions, and generate corresponding synchronized command signals; and a peripheral module structured to receive the synchronized command signals and generate output signals to be processed by the processor core in accordance with the control algorithm.

23 Claims, 8 Drawing Sheets

PROCESSOR SYSTEM EMPLOYING A SIGNAL ACQUISITION MANAGING DEVICE AND SIGNAL ACQUISITION MANAGING DEVICE

BACKGROUND

1. Technical Field

The present invention relates to the field of signal acquisition techniques, and more particularly, to signal acquisitions made in connection with control apparatuses.

2. Description of the Related Art

With reference to the PWM (Pulse Width Modulation) driven systems, such as three-phase motors, the acquisition of state variables occurs at pre-established instants with respect to the control cycle. Typically, the state variables are acquired by analog-to-digital converters and timers.

Microcontrollers that manage the acquisition of state variables and execute a control algorithm are known. Particularly, managing of the acquisition operations is performed by the microcontroller core that drives and synchronizes the analog-to-digital converters and timers in an Interrupt Service Routine to acquire the data necessary to execute the control algorithm.

BRIEF SUMMARY

It is observed that the above-described managing of the acquisition operations significantly increases the computational load of the microcontroller core.

According to an embodiment, a processor system for use with an external apparatus is provided that includes a processor core configured to control the external apparatus in accordance with a control algorithm; a signal acquisition managing device configured to receive state signals provided by the apparatus and generate corresponding synchronized command signals; and a peripheral module structured to receive the synchronized command signals, perform corresponding actions and generate output signals to be processed by the processor core in accordance with the control algorithm.

A further embodiment includes a signal acquisition managing device that includes a trigger generation unit and a scheduler unit.

In accordance with another embodiment of the present disclosure, a circuit for controlling an external apparatus is provided, the circuit including a signal acquisition managing device coupled to the external device to receive state signals from the external device, the signal acquisition managing device comprising: a trigger generator unit that receives the state signals and generates a reference signal and plurality of event trigger signals that each represent an event performance time.

In accordance with another aspect of the foregoing embodiment, the signal acquisition managing device includes a scheduler unit coupled to the trigger generation unit to receive each of the plurality of event trigger signals and to associate each event trigger signal with a synchronized command signal.

In accordance with another aspect of the foregoing embodiment, the trigger generation unit comprises a selector device adapted to build the reference signal that indicates a control cycle comprised between two occurrences of the reference signal; a counter device adapted to provide a counting value; and a comparator device adapted to compare the counting value to stored delay values and to generate the event trigger signals based on the results of the comparing of the counting value to the stored delay values.

In accordance with another aspect of the foregoing embodiment, the selector device is adapted to select event signals among the state signals and the comparator is configured to generate the event trigger signals within the control cycle, each of the event trigger signals being delayed with respect to each event signal by corresponding delay amounts.

These and other aspects of the present disclosure will be apparent from and elucidated with reference to the embodiments described hereinafter.

BRIEF DESCRIPTION OF THE SEVERAL VIEWS OF THE DRAWINGS

Further characteristics and advantages will be more apparent from the following description of a preferred embodiment and of its alternatives given as a way of an example with reference to the enclosed drawings in which.

DETAILED DESCRIPTION

Figure 1:
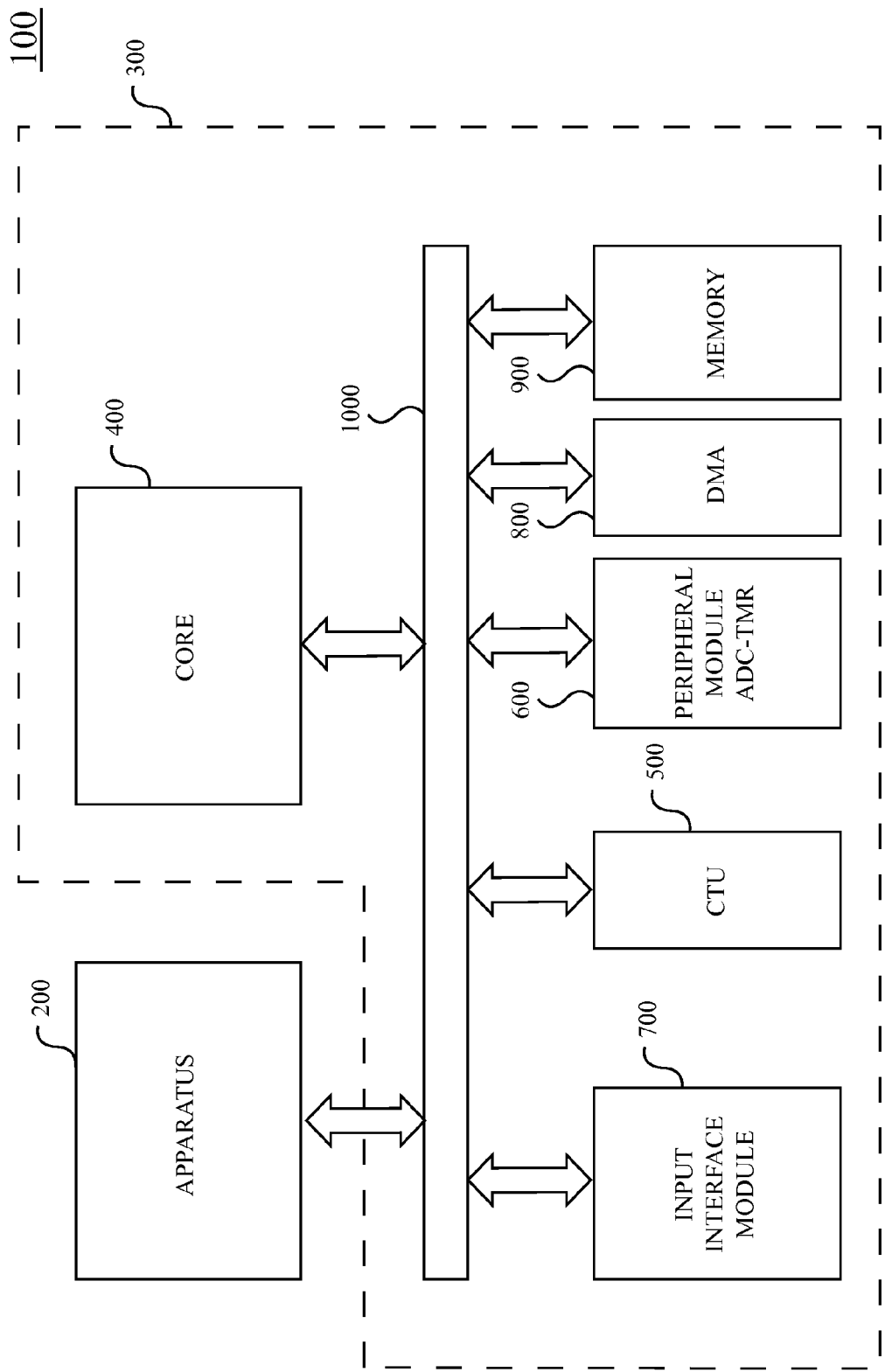
FIG. 1 schematically illustrates an electrical system comprising a controlled apparatus and a processor system.

FIG. 1 schematically shows an electrical system 100 having an apparatus 200 to be controlled and a processor system 300. The processor system 300 includes a processor core 400 configured to control the apparatus 200 in accordance with a control algorithm, a signal acquisition managing device 500 (CTU) and a peripheral module 600. In accordance with the particular embodiment shown in FIG. 1, the processor system 100 is also provided with an input interface module 700, a memory interface device 800 (DMA), and a memory 900. The above mentioned modules and devices are interconnected by a data and/or instruction bus 1000, which can comprise a crossbar switch (not shown).

The apparatus 200 can be controlled by the processor system 300 according to a PWM (Pulse Width Modulation) technique. Particularly, the apparatus 200 may be a three phase electrical motor or an air bag system having structures and operations known to those skilled in the art. The present description will refer to the particular case in which the apparatus 200 is a three phase electrical motor 200, but other types of devices to be controlled can be utilized.

The processor system 300 can be a microcontroller integrated in a semiconductor chip, and the processor core 400 is a CPU (Central Processing Unit) provided with, as an example, an integer execution unit, a multiply unit, an instruction unit and suitable registers (not shown). It is suitable to control the three phase electrical motor according to the PWM technique.

The input interface module 700 is connected to the three phase electrical motor 200 and is structured to detect state signals and to supply them to the signal acquisition managing device 500. As an example, the state signals are digital or analog signals representing state parameters of the three phase electrical motor 200 or positions of further actuators employed for the apparatus control. Moreover, according to an example, the state signals can include signals representing the generated PWM signals to be applied to the actuators or real PWM signals applied to the actuator or signals representing an external synchronization event. Particularly, the state signals may represent electrical currents or angular positions of the rotor included in the three phase electrical motor 200. The input interface module 700 may include at least one device belonging to the group consisting of: a Pulse Width Modulation duty cycle encoder, an input analog-to-digital converter, a sensor, a time unit, a position counter, a quadrature decoder, a resolver, and a sine-cos sensor. Moreover, the input interface module 700 is structured to supply to the signal acquisition managing device 500 a control period signal indicating the PWM control period.

The signal acquisition managing device 500 is distinct from the core 400 and is structured to manage the state signals acquisition operations. The signal acquisition managing device 500 is configured to receive state signals from the controlled apparatus 200 and generate corresponding synchronized command signals. The signal acquisition managing device 500 is realized in hardware and can be a mixture of sequential and combinational logic circuits. As an example, the employed combinational logic circuits can be programmable. Particularly, the signal acquisition managing device 500 is adapted to produce synchronized command signals that are synchronized with the control period signal indicating or correlated to the PWM control period provided by the input module 700. In FIG. 1, the signal acquisition managing device 1 is indicated by the initials CTU standing for Cross Triggering Unit. Embodiments of the signal acquisition managing device 500 will be described in greater detail later.

The peripheral module 600 is structured to receive the synchronized command signals from the signal acquisition managing device 500, to perform actions corresponding to the commands represented by the command signals, and to generate output signals carrying data to be processed by the processor core 400 in accordance with the control algorithm. As illustrated in FIG. 1, the peripheral module 600 can include at least one output analog-to-digital converter ADC configured to receive first synchronized command signals and generate digital state signals and at least one output timer TMR configured to receive second synchronized command signals and generate measured signals.

The output analog-to-digital converter ADC and the output timer TMR are activated by the corresponding synchronized command signals in order to perform the corresponding action on the state signals provided by the input interface module 700 (such as AD conversions and timer measurements) and to produce the output signals carrying data concerning the behavior of the three phase electrical motor 200.

The memory 900 is configured to store the data or part of such data carried by the output signals generated by the peripheral module 600 and can exchange data with the core 400 and the peripheral module 600. As an example, the memory 900 includes a RAM (Random Access Memory) and a flash memory. The memory interface device 800 can be a Direct Memory Access, which allows the peripheral module 600 to access the memory 900.

Figure 2:
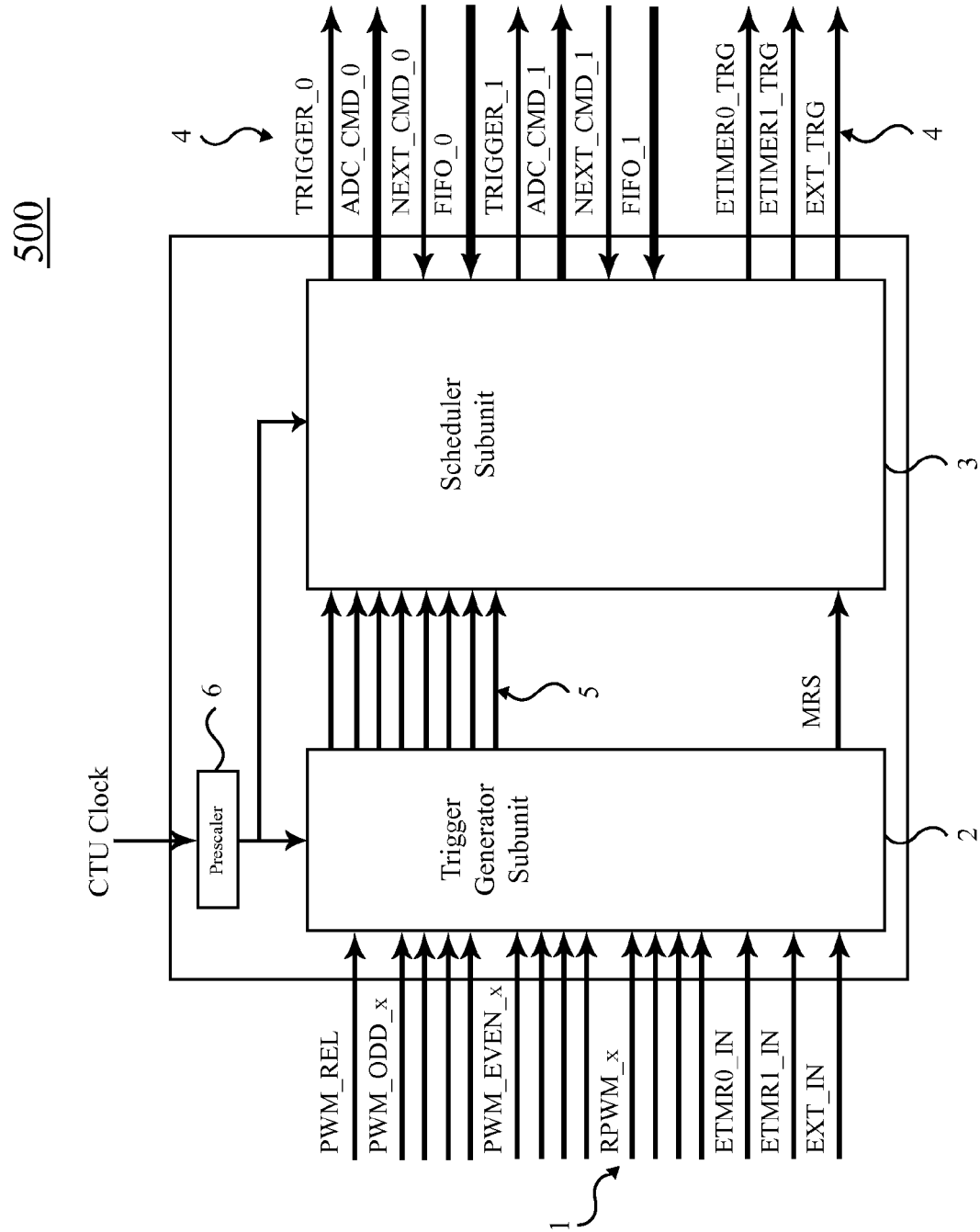
FIG. 2 shows an embodiment of a signal acquisition managing device comprising a trigger generator subunit and a scheduler subunit.

FIG. 2 illustrates by functional blocks an embodiment of the signal acquisition managing device 500 including a plurality of input terminals 1 for the state signals, a trigger generation subunit 2 and a scheduler subunit 3. The trigger generation subunit 1 is configured to build from the state signals a reference signal MRS and also, based on said reference signal MRS, to generate event trigger signals (on intermediate outputs 5), each representing the time in which an event has to be performed.

The scheduler subunit 3 is structured to associate each event trigger signal with a specific action and generate the corresponding synchronized command signal, to be supplied by means of respective output terminals 4, towards a specific peripheral device of the peripheral module 600. Each synchronized command signal represents an action to be performed by the corresponding peripheral device, e.g., a conversion to be carried out by the output analog-to-digital converter ADC or a measure to be carried out by the output timer TMR included in the peripheral module 600. As an example, a synchronized command signal provided to the output analog-to-digital converter ADC indicates which input channel among a plurality of channels entering the output analog-to-digital converter ADC has to undergo the conversion.

In greater detail, the signal acquisition managing device 500 illustrated in FIG. 2 is adapted to receive state signals from the following peripheral devices included in the input interface module 700: a PWM encoder, two timers and an external pin. The external pin is available to receive, for this purpose, the signal acquisition managing device 500 that is provided with sixteen input terminals 1 for receiving thirteen state input signals for the PWM duty cycle decoder (i.e., signals PWM_REL, PWM_ODD_x, . . . PWM_EVEN_x, RPWM_x . . . ), two state input signals from the timers (i.e., signals ETMR0_IN and ETMR1_IN) and one state input signal from the external pin (i.e., signal EXT_IN). In this example, the state signals are digital signals. Of course, the signal acquisition managing device 500 can include a different number of input or output terminals.

With reference to the output behavior, the signal acquisition managing device 500 depicted in FIG. 2 is adapted to provide the following synchronized command signals to the peripheral devices included in the peripheral module 600:

two synchronized command signals for the two output analog-to-digital converters ADC: first command signal ADC_CMD_0 and second command signal ADC_CMD_1;

two trigger signals for the two output analog-to-digital converters ADC: first trigger signal TRIGGER_0 and second trigger signal TRIGGER_1;

two triggers signals for the corresponding output timers TMR: third trigger signal ETIMER0_TRG and fourth trigger signal ETIMER1_TRG; and a trigger signal for the external pin: fifth trigger signal EXT_TRG. In accordance with the example given, the above indicated synchronized command signals are digital signals.

Moreover, the scheduler subunit 3 can be provided with two input terminals for receiving corresponding signals NEXT-CMD_0 and NEXT-CMD_1 generated by the two output analog-to-digital converters ADC and indicating the next synchronized command signals to be generated by the signal acquisition managing device 500. In addition the scheduler subunit 3 includes further input lines for receiving signals FIFO_0 and FIFO_1 carrying data resulting from the conversion made by the two output analog-to-digital converters ADC, which can be stored in suitable FIFO (First In First Out) memories included in the scheduler subunit 3. A prescaler 6 applying a frequency division (e.g., according to factors 1, 2, 3 or 4) of a CTU clock signal is also included in the signal acquisition managing device 500.

Figure 3:
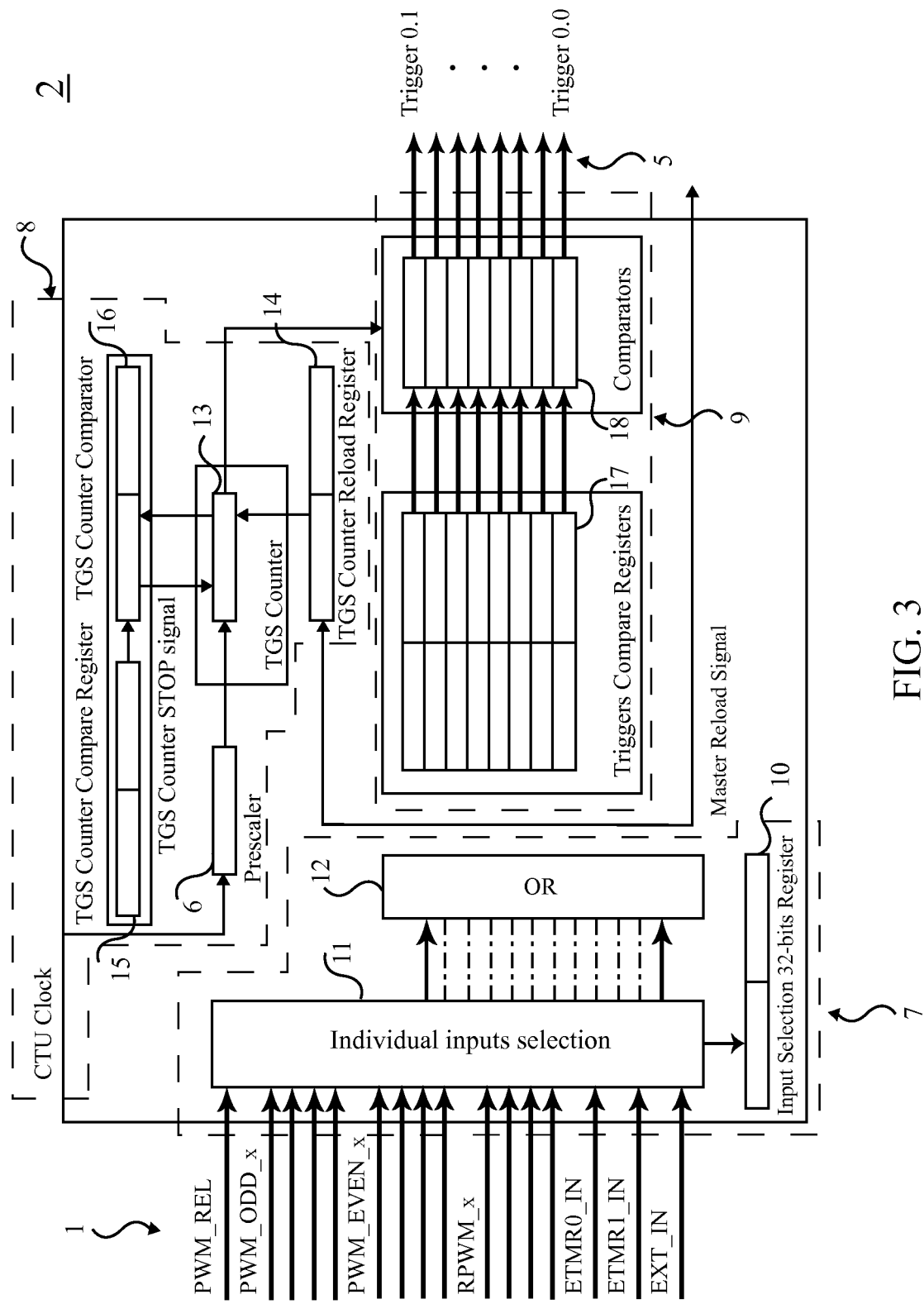
FIG. 3 shows a first embodiment of said trigger generator subunit.

FIG. 3 shows a first embodiment of the trigger generator subunit 2 that is configured to produce up to eight event trigger signals, Trigger0.0 ... Trigger0.7 on the outputs 5. The first embodiment of the trigger generator subunit 2 is configured to operate according to a first mode, i.e., a so called "triggered mode." In accordance with the first mode, the trigger generator subunit 2 builds the reference signal MRS, which is an impulsive signal, and any generated event trigger signal Trigger0.i is delayed by a pre-established amount with respect to the occurrence of the reference signal MRS. The reference signal MRS will be called hereinafter "master reload signal."

Figure 4:
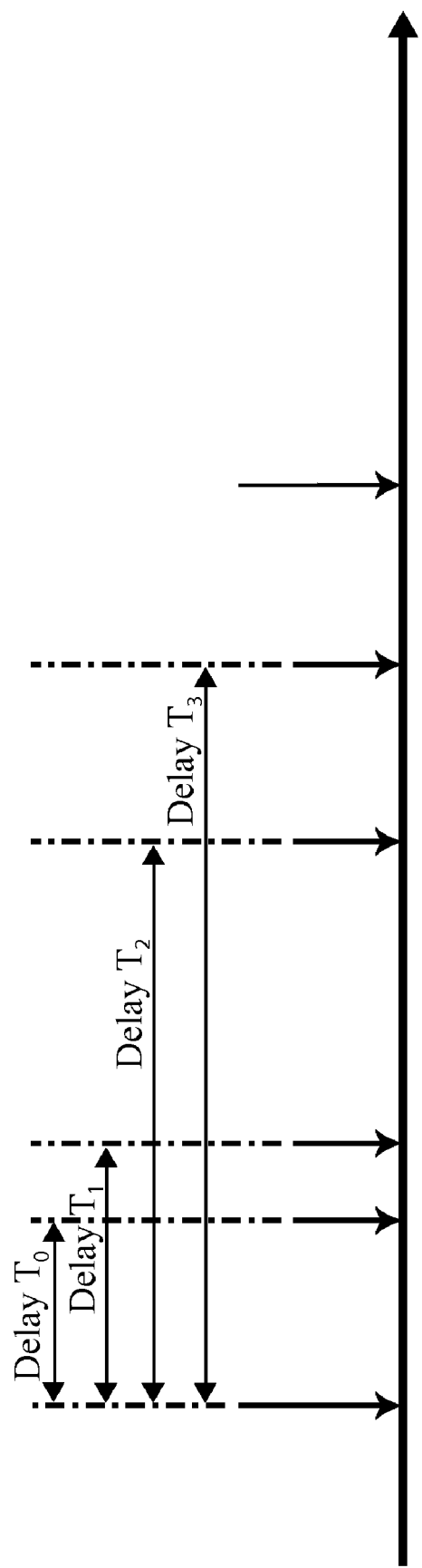
FIG. 4 shows an example of timing of the trigger generator subunit of FIG. 3.

FIG. 4 illustrates an example of timing of the trigger generator subunit 2 in accordance with the triggered mode. The longer arrows represent the occurrences of the master reload signal MRS and the shorter arrows indicate the starts (i.e., the generation instants) of some of the event trigger signals Trigger0.0 ... Trigger0.7. Each event trigger signal Trigger0.i is delayed with respect to the first longer arrow by a corresponding delay: Delay $T_0$, Delay $T_1$ ... Delay $T_3$.

With further reference to FIG. 3, the trigger generator subunit 2 includes a selector device 7, a counter device 8 and a comparator device 9. The selector device 7 comprises an input selection register 10, a selector 11 and an OR logic circuit 12. The input selection register 10 stores a digital word identifying the specific incoming state signal to be selected and the corresponding states to be chosen: inactive, rising edge, falling edge or both. As an example, the input selection register 10 comprises 32 bits; a couple of bits is dedicated to a input state signal and, depending on the selection made, up to 32 input events can be selected. The content of the input selection register 10 can be set by the user to configure the signal acquisition managing device 500 by means of the core 400 or by the memory interface device 800.

The selector 11 is configured to perform an individual input selection of the state signals supplied at the input terminals 1 based on the content of the input selection register 10. The OR logic circuit 12 signals allows to generate the master reload signal MRS from the signals selected by the selector 11. The occurrences of master reload signal MRS represent the start of the control cycle.

The counter device 8 includes a counter 13 (TGS Counter) synchronized by the exit of the prescaler 6, a counter reload register 14 (TGS Counter Reload Register), a counter compare register 15 (TGS Counter Compare Register) and a counter comparator 16 (TGS Counter Comparator). The counter 13 counts pulses of the clock signal exiting the prescaler 6. The counter reload register 14 stores a pre-load value to be transferred to the counter 13 at any occurrence of the master reload signal MRS. The counter compare register 15 generates a stop signal (TGS Counter STOP signal) when the counter 13 reaches a counting value equal to the one stored in the counter compare register 15, before the master reload signal MRS occurs. The counting value reached by the counter 13 is provided to the comparing device 9.

The compare device 9 comprises a plurality of triggers compare registers 17 and a plurality of comparators 18. In accordance with the described embodiment, the plurality of triggers compare registers 17 includes eight double buffered registers and the plurality of comparators 18 includes eight comparators.

Each trigger compare register 17 includes a digital representation of the value of the delay that the corresponding signal event trigger signal Trigger0.i has to show with respect to the master reload signal MRS. Each comparator 18 compares the counting value provided by the counter 13 with the delay stored in the corresponding trigger compare register 17 and generates an event trigger signal Trigger0.i when the counting value reaches the i-th delay. The values stored in the plurality of trigger compare registers 17 form a triggers list that can be updated, as an example, at any time during the control period. Moreover, the trigger list can be reloaded on each new master reload signal MRS and on an occurrence of the master reload signal MRS.

The master reload signal MRS, at the beginning of a control cycle N (defined by the occurrence of the master reload signal), is used to pre-load a counter register included in the counter 13, using a pre-load value written into the double-buffered counter reload register 14, during the control cycle N-1, and to reload all the double-buffered registers: trigger compare registers 17, counter reload register 14 and a trigger generator subunit control register (not shown), which stores data concerning configuration and operation aspects of the trigger generator subunit 2. On reload (occurrences of master reload signal MRS) the comparators 18 are disabled.

Figure 5:
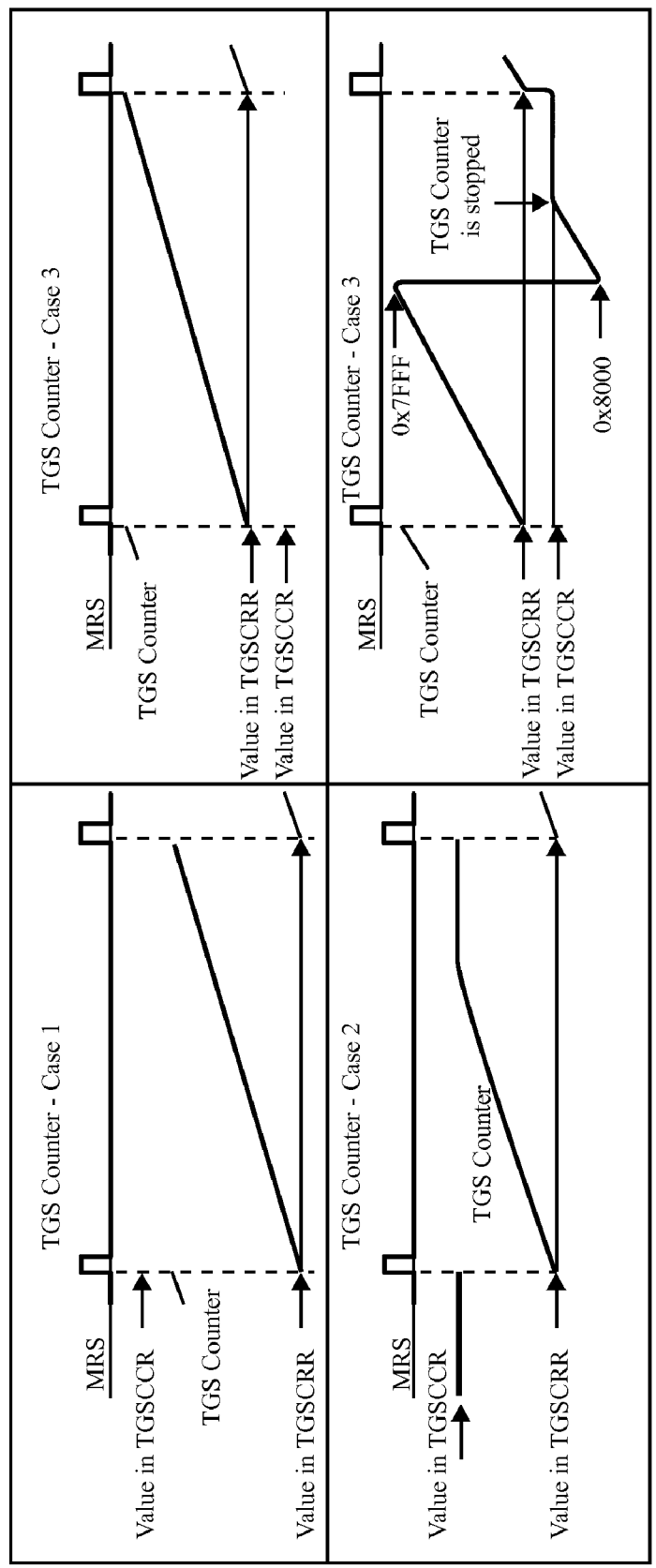
FIG. 5 shows four examples of behavior of a counter device included in the trigger generator subunit.

An example of timing of the counting performed by the trigger generator subunit 2 is shown in FIG. 5. Counter 13 is able to count from negative to positive, and the compare operation to stop the counter 13 is not enabled during the first counting cycle, in order to allow the counting, if the value of the counter reload register 14 is the same as the value of the counter compare register 15.

FIG. 5 shows the behavior of the counting variable "TGS Counter" of the counter 13 in connection with different cases of the values TGSCCR stored in the compare counter register 15 and the ones TGSCRR stored in the counter reload register 14, in a control cycle defined by the master reload signal MRS. Case 1 refers to the situation in which the counter 13 is not stopped within the control cycle. Case 2 refers to the situation in which the counter 13 starts from the value stored in the counter reload register (TGSCRR) and is stopped at the value stored in the compare counter register 15 before the control cycle was terminated. Case 3 refers to the situation in which the counter 13 starts from a value greater than the value stored in the in the compare counter register 15. Case 4 relates to the situation in which counter 13 reaches the maximum possible counting value; the counting re-starts from a negative value and subsequently the value stored in the compare counter register 15 is reached.

Figure 6:
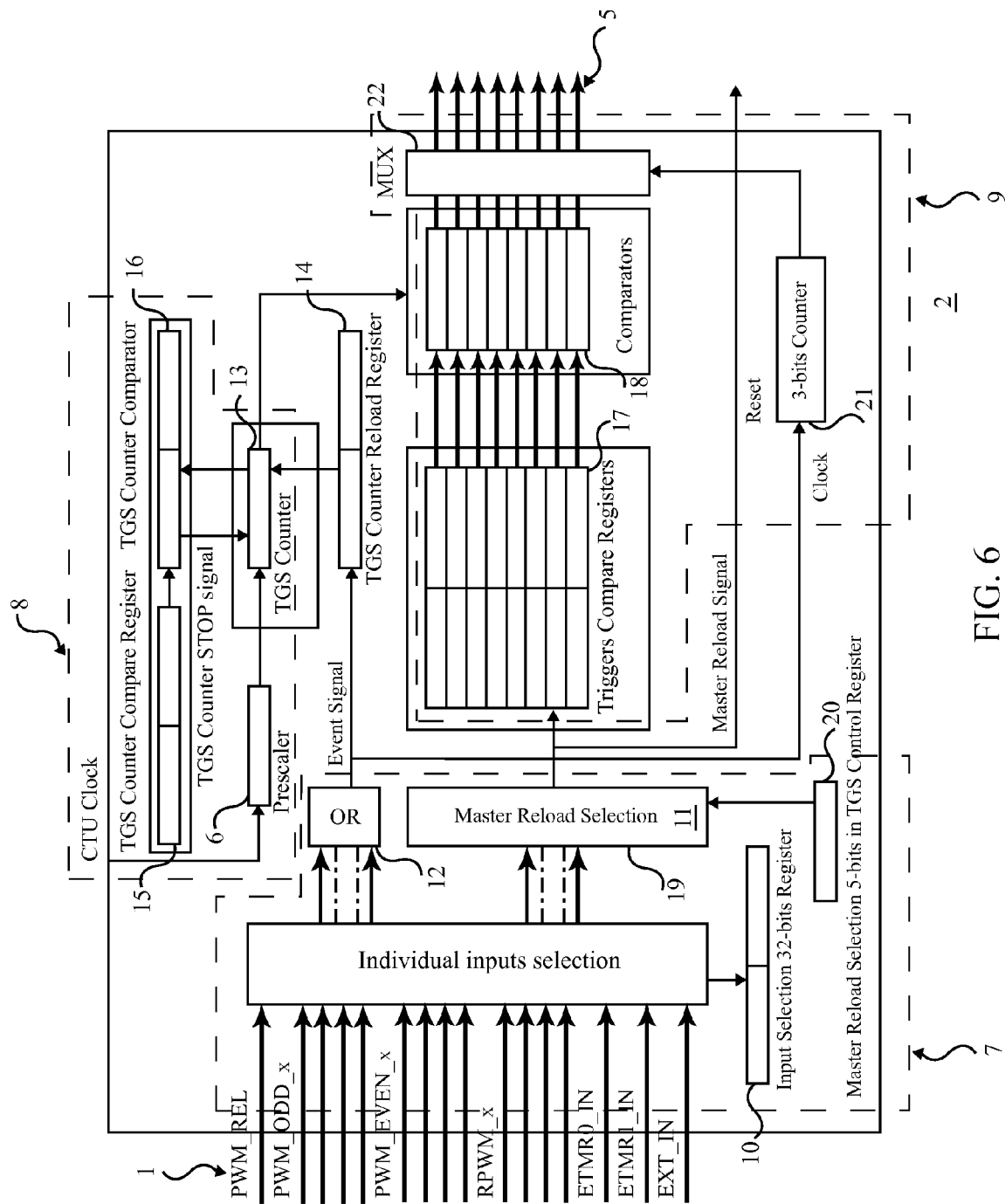
FIG. 6 illustrates a second embodiment of said trigger generator subunit.

FIG. 6 shows a second embodiment of the architecture of the trigger generation unit 2, which is analogous to the one illustrated in FIG. 3, but it uses a second timing mode of generation of the trigger event signals, i.e., a so called "sequential mode." According to the sequential mode, the trigger generator subunit 2 receives the state signals and builds from them the master reload signal MRS which is used to generate the first trigger event signal Trigger0.i. Moreover, another incoming state signal is used to build an event signal ES from which another trigger event signal is generated, and so in a predefined sequence.

Figure 7:
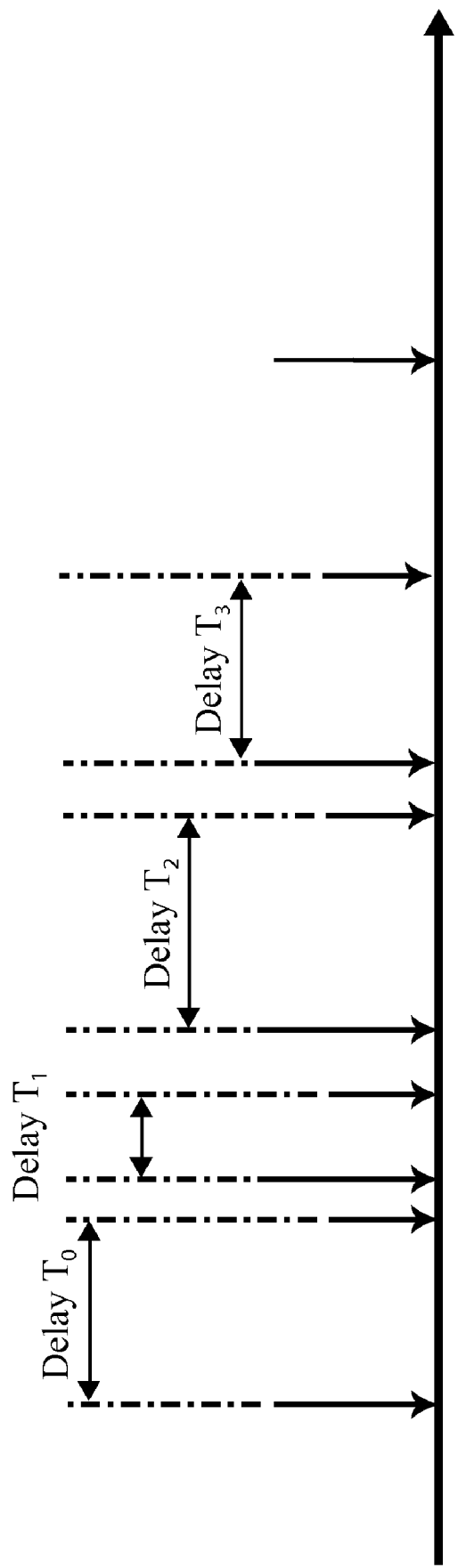
FIG. 7 shows an example of timing of the trigger generator subunit of FIG. 6.

FIG. 7 shows an example of a timing diagram for the trigger generation unit 2 in the sequential mode. The first longer arrow represents an occurrence of the master reload signal MRS, while the other longer arrows represent the occurrences of the other event signals ES. Each trigger event signal Trigger0.i (shorter arrows) is generated at a predetermined delay from the master reload signal MRS or the events signal ES occurrences.

With further reference to FIG. 6, the selector device 7 further includes a master reload selection module 19 used to build the master reload signal from the incoming state signals and a master reload selection register 20, which include data indicated which one of the state signals has to be elected as master reload signal MRS. The master reload signal MRS enables the reload of the trigger compare registers 17. Part of the signals exiting the selector 11 are added in the OR logic circuit 12 in order to generate the event signal ES. The event signal ES is used to enable the reload of the counter reload register 14.

In accordance with the embodiment of FIG. 6, the comparator device 9 further includes an output counter 21 and a selection switch 22 (MUX) which is connected to receive the signals exiting comparator 18. The output counter 21 (e.g., a 3-bit counter) counts the occurrences of the event signal ES and can be reset by the master reload signal MRS. The selection switch 22 enables only one event trigger signal of the plurality of signals exiting the comparator 18 according to the number of event signals ES occurred, which is provided by the output counter 21. Particularly, sequences of up to eight trigger event signals can be supported within a control cycle.

According to another embodiment, the acquisition managing device 500 is configured to implement selectively the trigger mode and the sequential mode. The switching from the sequential mode to the trigger mode and vice versa can be performed by the processor core 400 which can read a mode selection data stored in a corresponding register. As is clear from FIG. 3 and FIG. 6, the trigger generation unit 2 shares components in the two different operation modes which can be employed in any of the two operation modes.

Figure 8:
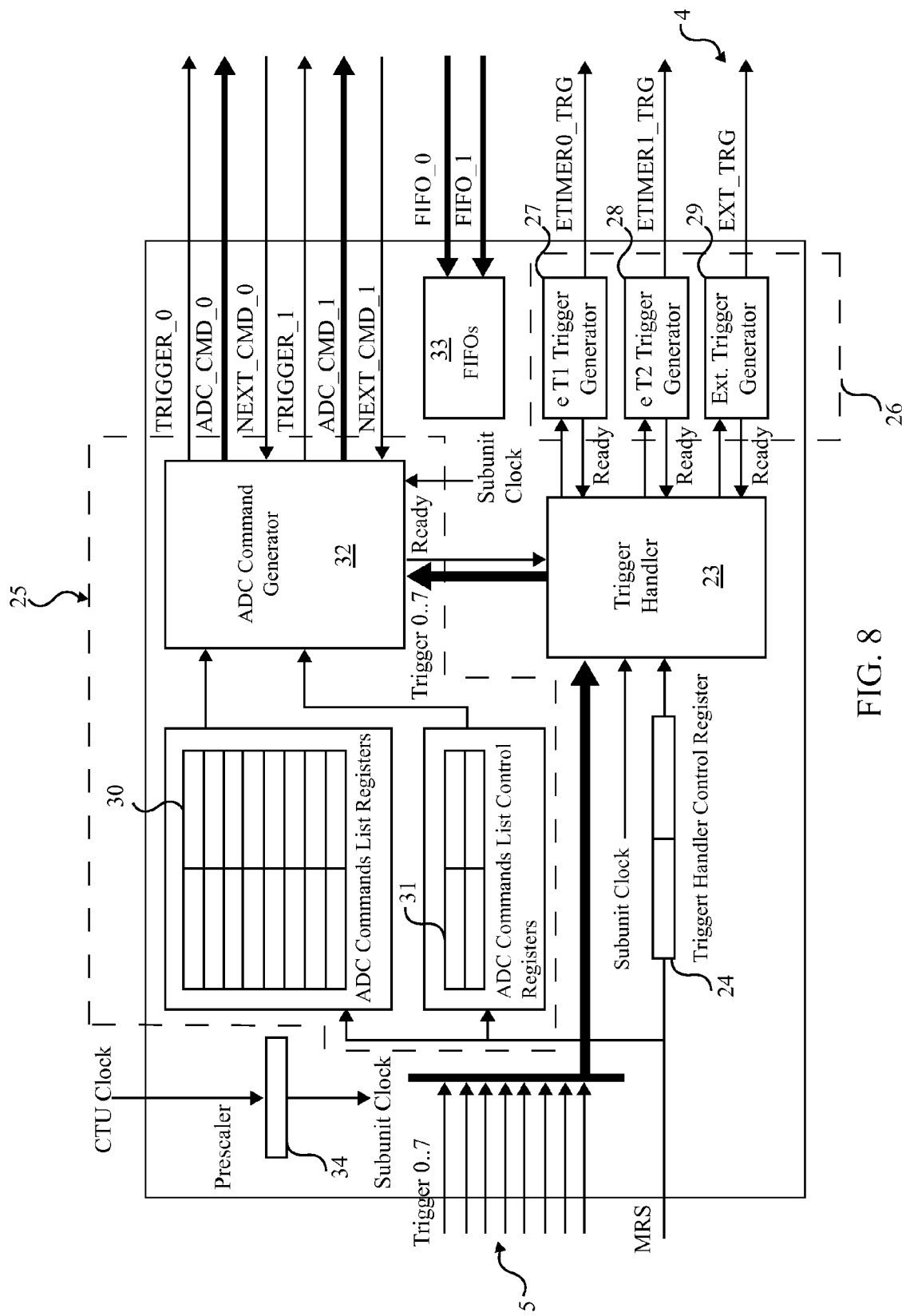
FIG. 8 illustrates an embodiment of the scheduler subunit.

FIG. 8 shows an embodiment of the scheduler unit 3, which comprises a trigger handler 23 provided with a trigger handler control register 24, a command generator device that includes an ADC command generator device 25 and an output trigger generator 26. The trigger handler 23, which is synchronized by the subunit clock signal 33, receives the event trigger signals Trigger 0.1-Trigger 0.7 and assigns to each event trigger signal Trigger 0.i a corresponding output of the plurality 4 and drives the ADC command generator device 25 and the output trigger generator 26. The subunit clock signal 33 is generated by a further prescaler 34. The trigger handler control register 24 receives the master reload signal MRS provided by the trigger generation unit 2 in order to perform its reload (if required) and store a data which serves to assign one or more action to each event trigger signals Trigger 0.1-Trigger 0.7. The trigger handler 23 can be a sequential logic circuit or can include both sequential circuit and combinational programmable logic circuit.

The ADC command generator device 25 includes: a plurality of ADC commands list registers 30, a plurality of ADC commands list control registers 31, and an ADC command generator 32. The ADC command generator 32 is driven by the trigger handler 23 to generate the synchronized command signals directed to the analog-to-digital converter included in the peripheral module 600 (FIG. 1): first command signal ADC_CMD_0 and second command signal ADC_CMD_1, the first and second trigger signals TRIGGER_0 and TRIGGER_1. The first and second command signals ADC_CMD_0 and ADC_CMD_1 can have the forms of stream of commands.

The ADC commands list registers 30 (e.g., each of them are of the double-buffered type) store a list of commands to be associated to each event trigger signal Trigger0.i and the ADC commands list control registers 31 (e.g., each of them are the double-buffered type) store indexes that allow to associate the incoming event trigger signal Trigger0.i with the corresponding synchronized command signal. The ADC command generator 32 reads the value stored into the ADC commands list control registers 31 and decides whether to generate a subsequent synchronized command signal or stay. The reload of the ADC commands list registers 30 and ADC commands list control registers 31 is enabled by an occurrence of the master reload signal MRS.

As an example, the command list stored in the double-buffered commands list registers 30 can hold 24×16-bits commands and can be updated at any time between two consecutive occurrences of the master reload signal MRS, but the changes become workable only after the next occurrence of the master reload signal MRS occur, and a correct reload is performed. The ADC commands list control registers 31 to store, as an example, 5 bits for the position of the first command in the list of commands for each trigger event signal. Particularly, the number of commands piloted by a single trigger event signal is defined directly in the command list. For each command there is a bit that defines whether it is the first command of a corresponding command list.

The output trigger generator 26 includes a first timer trigger generator 27, a second timer trigger generator 28, and an external trigger generator 29, which are driven by the trigger handler 23 to generate the third trigger signal ETIMER0_TRG, the fourth trigger signal ETIMER1_TRG, the fifth trigger signal EXT_TRG, respectively. Typically, the above mentioned trigger signals are pulse signals having rising edges. The ADC command generator 32, the first timer trigger generator 27, the second timer trigger generator 28, and the external trigger generator 29 are configured to provide a respective ready signal to the trigger handler 23 indicating that they are available for the generation of a next synchronized command signal since the managed peripheral devices included in the peripheral module 600 are available for the execution of a next synchronized command.

The acquisition signal managing device 500 is also provided with a control register (not shown), which can be used by the core processor 500 in order to control the operation of the acquisition signal managing device 500. Such control register may store an updating bit indicating that the updating of the double-buffered registers of the acquisition signal managing device 500 (e.g., the ADC commands list control registers 31) is complete. Particularly, if there is an occurrence of the master reload signal MRS while a user is updating the registers of the acquisition signal managing device 500 (i.e., the updating bit indicated the updating is not complete) an error message is generated by the acquisition signal managing device 500.

In accordance with the particular embodiment shown in FIG. 8, the scheduler unit 3 is also provided with at least one FIFO memory 33 which can be employed to store the data resulting from conversion performed by the two analog-to-digital converters ADC included in the peripheral module 600. As an example, four FIFO memories can be employed to store different types of acquired data: phase current, rotor position, ground-noise, other. The FIFO memory 33 is provided with the input lines FIFO_0 and FIFO_1.

In operation, the input interface module 700 (FIG. 1) detects from apparatus 200 state signals that are provided to the signal acquisition managing device 500. The trigger generator subunit 2 generates the master reload signal MRS based on the state signals and the trigger event signals using the counter 13 and the comparators 18. The master reload signal MRS and the trigger event signals are then provided to the scheduler subunit 3, which by means of the trigger handler 23 drives the ADC command generator device 25 and the output trigger generator 26. Then, the synchronized command signals are produced and supplied to the peripheral module 600 in which corresponding actions, such as digital conversion and measures, are performed on the state signals. The results of the digital conversions can be stored in the FIFO memory 33 or together with the measurements performed by the timers in the memory 900. The state signals have been properly acquired and the corresponding data can be read by the processor core 400 in order to drive the apparatus 200.

It has to be observed that the managing of the acquisition operations above described does not involve the processor core 400, but it is performed by the signal acquisition managing device 500. Therefore, the computational load is reduced for the processor core 400. Moreover, the described signal acquisition managing device 500 improves the acquisition performances in comparison with the ones obtainable according to the traditional techniques in which the acquisition is managed by the processor core. Indeed, all the acquisitions are performed at the correct instants and delays due to the latency of the Interrupt Service Routine implemented by the processor core are avoided.

In the foregoing specification, the invention has been described with reference to specific examples of embodiments of the invention. It will, however, be evident that various modifications and changes may be made therein without departing from the broader spirit and scope of the invention as set forth in the appended claims. For example, the signal acquisition managing device 500 can be integrated in the same chip in which the processor core 400 (i.e. the CPU) is integrated or can be integrated in a separate chip. According to further examples, the apparatus 200 can be a direct current electrical motor, a single-phase electrical motor, a multi-phase electrical motor or a DC/DC converter, a solenoid or a sensor such as a resolver sensor or a sine-cosine sensor. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processor system for use with an external apparatus, the system comprising:
   a processor core configured to control the external apparatus in accordance with a control algorithm;
   a signal acquisition managing device configured to receive state signals from the external apparatus and to generate corresponding synchronized command signals that are synchronized relative to a control period;
   a peripheral module structured to receive the synchronized command signals and to generate output signals to the processor core; and
   a trigger generation unit configured to build from the state signals a reference signal and to generate event trigger signals, the trigger generation unit including:
     a selector device adapted to build the reference signal that indicates a control cycle that is between two occurrences of the reference signal;
     a counter device structured to provide a counting value; and
     a comparator device adapted to compare the counting value to stored delay values and to generate the event trigger signals based on the comparing results.

2. The system of claim 1, wherein the peripheral module includes:
   at least one analog-to-digital converter configured to receive first synchronized command signals and to generate digital state data from the received state signals.

3. The system of claim 2, wherein the peripheral module further includes:
   at least one timer configured to receive second synchronized command signals and to generate measuring signals in response to the received state signals.

4. The system of claim 1, further comprising:
   an input module connectable to the external apparatus and structured to supply the state signals to the signal acquisition managing device.

5. The system of claim 4, wherein said input module comprises at least one device belonging to the group consisting of a Pulse Width Modulation duty cycle decoder, an analog-to-digital converter, a timer unit, a sensor, a position counter, a quadrature decoder, a resolver sensor, and a sine-cos sensor.

6. The system of claim 5, wherein said processor core is configured to process the output signals provided by the peripheral module in accordance with a PWM technique.

7. The system of claim 4, wherein the input module is configured to receive first signals representing electrical currents or second signals representing actuator positions or third signals representing generated PWM signals or fourth signals representing PWM signals applied to the actuator or fifth digital signals representing an external synchronization event and to provide a corresponding state signal.

8. The system of claim 4, wherein the state signals include a control period signal that indicates the control period used by the control algorithm.

9. The system of claim 1, further comprising:
   a memory configured to store the output signals, the memory adapted to be readable by the processor core; and
   a memory interface device configured to allow access by the signal acquisition managing device to the memory.

10. The system of claim 1, wherein said signal acquisition managing device includes:

a plurality of input terminals structured to receive the state signals; and a scheduler unit structured to associate each event trigger signal with a synchronized command signal to be supplied towards the peripheral module and representing the event to be performed.

11. The system of claim 1, wherein the comparator device is structured to generate the event trigger signals within the control cycle, and wherein the trigger generation unit is configured to delay the event trigger signals with respect to a first occurrence of the reference signal by the delay values.

12. The system of claim 11, wherein the comparator device includes registers to store the delay values, the registers structured to be re-loaded at a second occurrence of the reference signal.

13. The system of claim 1, wherein
the selector device is adapted to select event signals among the state signals; and
the comparator is configured to generate the event trigger signals within the control cycle; and to delay each of the event trigger signals with respect to each event signal by corresponding delay amounts.

14. The system of claim 10, wherein the scheduler unit includes:
at least one command generator structured to provide the command signals; and
a trigger handler configured to receive the event trigger signals and to drive the at least one command generator to assign to each event trigger signal a corresponding output of the scheduler unit.

15. The system of claim 14, wherein the at least one command generator includes:
a first command generator structured to generate first command signals to be provided to an analog-to-digital converter; and
at least one second command generator configured to generate trigger signals to be provided to at least one timer.

16. A signal acquisition managing device for use with an external peripheral module comprising:
a plurality of input terminals structured to receive state signals;
a trigger generation unit configured to build from the state signals a reference signal and to generate event trigger signals, each event trigger signal representing a time in which an event has to be performed, the trigger generation unit including:
a selector device adapted to build the reference signal that indicates a control cycle that is between two occurrences of the reference signal;
a counter device structured to provide a counting value; and
a comparator device adapted to compare the counting value to stored delay values and to generate the event trigger signals based on the comparing results; and
a scheduler unit structured to associate each event trigger signal with a synchronized command signal to be supplied to the external peripheral module and representing the event to be performed.

17. The acquisition managing device of claim 16, wherein the comparator device is structured to generate the event trigger signals within the control cycle, the event trigger signals delayed with respect to a first occurrence of the reference signal by the delay values.

18. The acquisition managing device of claim 16, wherein the scheduler unit includes:
a command list register structured to store data indicating command typology;
a command generator configured to generate the command signals based on the data stored into the command list register; and
a trigger handler configured to receive the event trigger signals and to drive the command generator to assign to each event trigger signal a corresponding output of the scheduler unit.

19. A circuit for controlling an external apparatus, the circuit comprising:
a signal acquisition managing device coupled to the external apparatus to receive state signals from the external apparatus, the signal acquisition managing device including:
a trigger generator unit structured to receive the state signals and to generate a reference signal and a plurality of event trigger signals that each represent an event performance time, the trigger generator unit including:
a selector device adapted to build the reference signal that indicates a control cycle comprised between two occurrences of the reference signal;
a counter device adapted to provide a counting value; and
a comparator device adapted to compare the counting value to stored delay values and to generate the event trigger signals based on the results of the comparing of the counting value to the stored delay values.

20. The circuit of claim 19, wherein the signal acquisition managing device further includes a scheduler unit coupled to the trigger generation unit and structured to receive each of the plurality of event trigger signals and to associate each event trigger signal with a synchronized command signal.

21. The circuit of claim 20, wherein the scheduler unit includes at least one command generator structured to generate the synchronized command signal and a trigger handler adapted to receive the event trigger signals and to drive the at least one command generator to assign to each event trigger signal a corresponding output of the scheduler unit.

22. The circuit of claim 21, wherein the at least one command generator includes a first command generator structured to generate first command signals to be provided to an analog-to-digital converter, and at least one second command generator configured to generate trigger signals to be provided to at least one timer.

23. The circuit of claim 19, wherein the selector device is adapted to select event signals among the state signals, and the comparator is configured to generate the event trigger signals within the control cycle, each of the event trigger signals being delayed with respect to each event signal by corresponding delay amounts.

* * * * *